(12) United States Patent
Rini et al.

(10) Patent No.: US 8,307,934 B2
(45) Date of Patent: Nov. 13, 2012

(54) VEHICLE FIRE PREVENTION AND DETECTION SYSTEM

(75) Inventors: Guy T. Rini, Winchester, VA (US); Charles J. Groeller, Orefield, PA (US)

(73) Assignee: GTR Development LLC, Winchester, VA (US)

( * ) Notice: Subject to any disclaimer, the term of this patent is extended or adjusted under 35 U.S.C. 154(b) by 95 days.

(21) Appl. No.: 12/803,247

(22) Filed: Jun. 22, 2010

(65) Prior Publication Data
US 2010/0320021 A1 Dec. 23, 2010

(51) Int. Cl.
*B60K 28/00* (2006.01)
(52) U.S. Cl. ........ 180/271; 180/279; 180/283; 307/10.1
(58) Field of Classification Search .................. 180/271, 180/279, 283, 284; 340/428, 426.25, 438, 340/635, 636.1, 636.12, 636.13, 636.17, 340/636.18, 636.19, 636.2; 307/10.1, 10.6, 307/10.7
See application file for complete search history.

(56) References Cited

U.S. PATENT DOCUMENTS

| | | | | | |
|---|---|---|---|---|---|
| 3,576,488 | A | * | 4/1971 | Zug et al. ................. | 340/636.15 |
| 3,787,805 | A | * | 1/1974 | Combrinck ................. | 307/10.3 |
| 3,835,362 | A | * | 9/1974 | Greene ......................... | 320/134 |
| 4,176,284 | A | * | 11/1979 | Higgs .......................... | 307/10.7 |
| 4,410,775 | A | * | 10/1983 | Howard ...................... | 200/52 R |
| 4,861,684 | A | * | 8/1989 | Law .................................. | 429/7 |
| 5,120,271 | A | * | 6/1992 | Shtanko ........................ | 454/137 |
| 5,488,352 | A | * | 1/1996 | Jasper ........................... | 340/431 |
| 5,535,842 | A | * | 7/1996 | Richter et al. ................ | 180/279 |
| 5,633,538 | A | * | 5/1997 | Nickerson ..................... | 307/10.8 |
| 5,818,121 | A | * | 10/1998 | Krappel et al. .............. | 307/10.7 |
| 5,936,531 | A | * | 8/1999 | Powers ......................... | 340/628 |
| 6,462,293 | B2 | * | 10/2002 | Nakamura et al. .......... | 200/318.1 |
| 6,466,024 | B1 | * | 10/2002 | Rogers .......................... | 324/427 |
| 6,671,159 | B2 | * | 12/2003 | Nakamura et al. ............ | 361/170 |
| 6,672,954 | B2 | * | 1/2004 | Shtanko ........................ | 454/131 |
| 6,734,651 | B2 | * | 5/2004 | Cook et al. .................... | 320/103 |
| 6,765,312 | B1 | * | 7/2004 | Urlass et al. .................. | 307/10.1 |
| 7,339,774 | B2 | * | 3/2008 | Zdziech et al. .............. | 361/93.1 |
| 2001/0015883 | A1 | * | 8/2001 | Nakamura et al. ............ | 361/170 |
| 2004/0174141 | A1 | * | 9/2004 | Luz et al. ...................... | 320/132 |
| 2007/0158127 | A1 | * | 7/2007 | Taguchi et al. ............... | 180/271 |
| 2008/0143461 | A1 | * | 6/2008 | Hastings et al. ................... | 335/7 |
| 2008/0151454 | A1 | * | 6/2008 | Uhl ................................ | 361/87 |
| 2010/0320021 | A1 | * | 12/2010 | Rini et al. ...................... | 180/271 |
| 2011/0234166 | A1 | * | 9/2011 | Liu ................................ | 320/132 |

* cited by examiner

*Primary Examiner* — Eric Culbreth
*Assistant Examiner* — Barry Gooden, Jr.
(74) *Attorney, Agent, or Firm* — Anova Law Group, PLLC; Wenye Tan

(57) ABSTRACT

This invention provides fire prevention and detection for heavy-duty and medium-duty commercial and military vehicles by ensuring the engine is automatically and immediately shut down upon the occurrence of a catastrophic event that may lead to a fire. The shutdown is achieved through the isolation of the vehicle batteries and alternator and the disconnecting of those devices from all electrical circuits. Anomalies that cause the shutdown and disconnect include battery and vehicle load currents that are outside a preset range, excessive temperatures, detection of smoke in the drive compartment or sleeper, or detection of a frontal impact accident or vehicle rollover. Once disconnected, the battery contactor must be manually reset in order to restore electrical power to the vehicle.

10 Claims, 1 Drawing Sheet

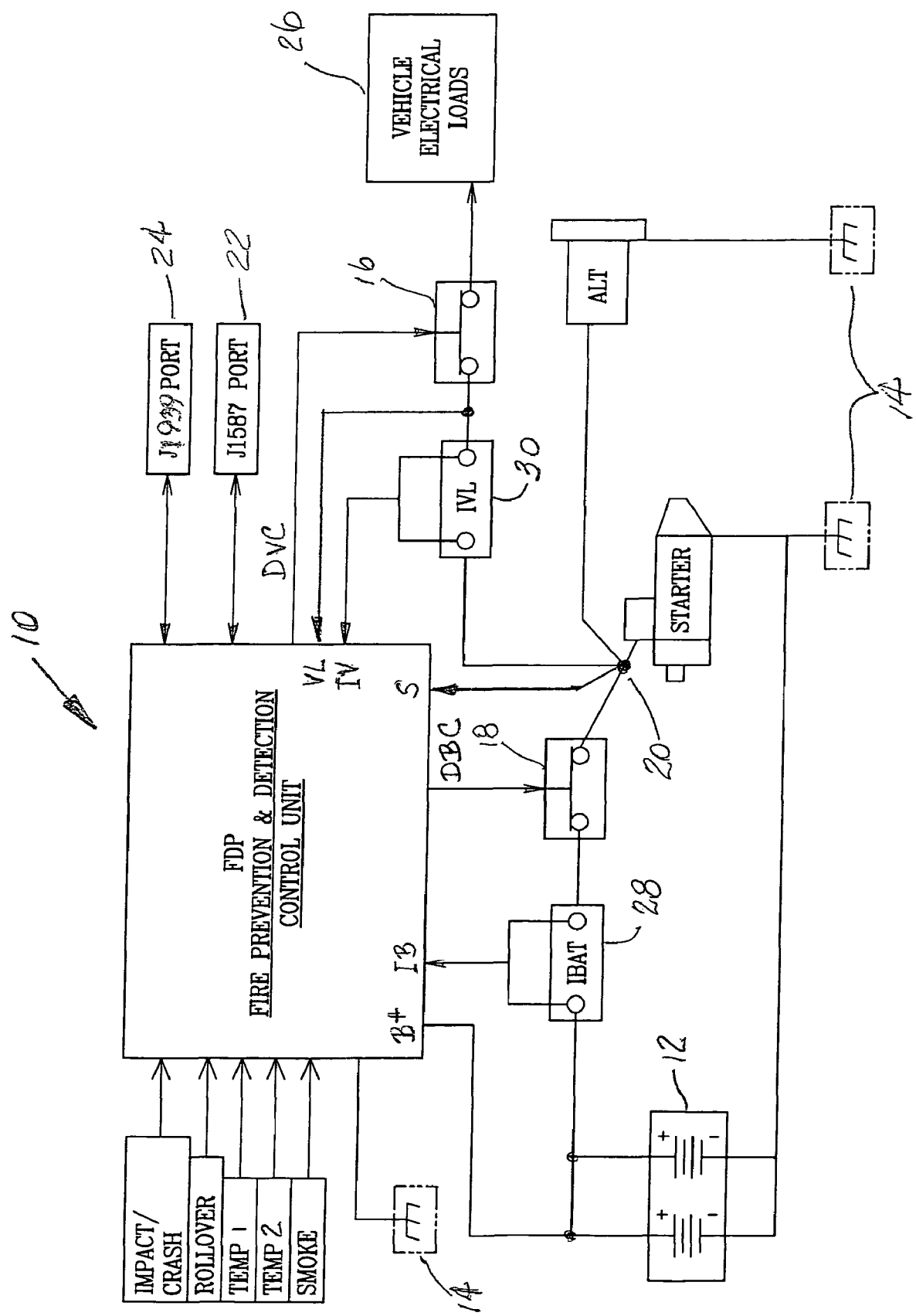

VEHICLE FIRE PREVENTION AND DETECTION SYSTEM

BACKGROUND OF THE INVENTION

There has been an alarming increase in truck fires in recent years. Data suggest that the increased rate may be related to the newer emission standards for on highway diesel engines. In 2004 the Environmental Protection Agency (EPA) mandated lower levels of criteria emissions; nitrogen oxides (NOx) and particulate matter (PM). In 2007 there was another, more stringent, reduction in PM and the 2010 emission regulation will then further reduce the NOx emissions.

Both the 2004 and 2007 standards resulted in engine and exhaust after treatment technologies that create high heat rejection. Specifically, exhaust gas recirculation (EGR) technology was introduced and engine injection timing became more retarded. This results in a higher demand of the coolant system, higher under hood and in chassis temperatures. Starting in 2007 the lower PM standard was achieved on medium and heavy-duty vehicles by use of a diesel particulate filter (DPF) and in some cases a Diesel Oxidation Catalyst (DOC). These devices once activated can achieve temperatures above 1100° F. They are typically not under.

The hood but under or behind the cab. This has resulted in much higher in chassis temperatures as compared to earlier model vehicles. Typically the under hood temperatures and the under cab temperatures in the vicinity of the exhaust after treatment well exceed the flash point temperature of the #2 Diesel fuel which is 130° F. The elevated temperature can lead to degradation or compromising to components of the electrical systems.

The recent "Official Fleet Survey" conducted by The Technology and Maintenance Council (TMC) of the American Trucking Association (ATA) covered 130,000 in service tractors, 76,500 straight trucks and 300,000 trailers. The survey indicates Electrical, Fuel Systems and Engine failures are the cause of most fires with newer vehicle more receptive to fires than older vehicles.

The surveys and individual testimony suggest that electrical arcs or shorts are typically the cause of igniting diesel fuel or engine oil. These are referred to as electrical fires. It should be noted that an electric arc, high temperatures, fuel spill, or oil spill cannot in itself be a cause of a fire. It takes an arc or high temperature to ignite the flammable product. Some electrical fires involve material commonly used in vehicles other than fuel or oil.

The electrical fire incident associated with a severe accident is usually explained by movement of the drive train that will cause a chafing or tearing of the battery cables between the cables two fixed points, one on the frame rail and the other on an engine mount or starter assembly. Some drive trains are designed to allow the engine to dropdown in the event of an accident. This helps prevent the engine from penetrating through the fire wall. It also creates a high probability of the battery cables being ripped and torn open, along with fuel lines to the engine and the fuel crossover line between fuel tanks to rupture. There is no guarantee that the engine will stop running since the integrity of the alternator, engine wiring and engine ECU isn't jeopardized. Any fire caused by the accident can be further enabled by the engine pumping fuel, oil and/or air on to the fire. These types of fires are very intense and catastrophic. Roll over events are another cause of accident related electrical fires.

There is no vehicle manufacturer that currently offer a true automatic electrical disconnect in the event of an accident or abnormality in the electrical system. In fact, most modern diesel engines are designed so that the electrical power to the engine ECU remains on for several seconds after a key shut down so that electronic data can be properly stored in memory.

Earlier devices only disconnect the battery to ensure the engine cannot be started. None of these devices are structured to shut down the engine, once it is running, just by disconnecting the battery. This is because the alternator is a separate and primary source of electrical energy once the engine is running. The connection between the alternator and vehicle loads, including the engine electronics, ensure the engine continues to run. Furthermore none of these devices specifically addresses fire protection and detection.

This invention provides an automatic disconnect in the event of a crash, roll over, or abnormality in the electrical systems that create a high potential for fires. The invention will immediately cut electrical power from the batteries and ensures an immediate shutdown of the engine by removing all electrical power from the cab and engine. In addition there are temperature sensors and/or smoke detectors that are used to trigger an electrical disconnect. These features provide early detection and prevention, stemming from an electrical short or other events that can create elevated temperatures.

SUMMARY OF THE INVENTION

This invention is designed to prevent or restrict fires by disconnecting electrical power from the batteries and ensuring the engine is turned off by disconnecting the alternator from all electrical loads including the engine control module. The disconnects are accomplished through two electrical contactors. One contactor is in series with the batteries and the other contactor is in series with the vehicle electrical bus. The contactors are manually set (closed contacts) and remain closed during normal operation. Once a fault or fire condition is detected the contactors are electrically disabled. The engine is shut down and the batteries are disconnected from all circuits. This event is none reversible. The contactors can only be reset manually.

The contactors are disabled (open circuit) for any of several events; either a high temperature limit (from the engine compartment); smoke in the driver or sleeper compartment; electrical current out of range (open circuit or high limit); a high impact (crash incident) or a vehicle rollover. All of these conditions are abnormal and create the potential of a vehicle fire. In some cases a fire might have already started. This invention ensures that further escalation of a fire isn't supported by an electrical source or from the engine creating heat and possibly pumping fuel or oil on to the fire.

In normal operation the system detects: excessive heat under the hood that would support combustion or is the result of a fire that just started; smoke in the driver and/or sleeper compartment; abnormally high battery current; and abnormally high current delivered to the Electrical Distribution Panel, among the monitoring of a number of other parameters described below. The system monitors for abnormal conditions such as a frontal crash or vehicle rollover. In the event that the abnormal condition is detected, the system disconnects the batteries and disconnects the battery and alternator feed to the cab resulting in engine shutdown. A manual reset is required after any disconnect of the battery or vehicle load contactor.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 1 shows a schematic diagram of the control apparatus for detecting abnormal conditions for a land vehicle engine and engine electrical system and controlling engine shutdown to prevent fires upon detection of preset parameters.

DETAILED DESCRIPTION OF THE INVENTION

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Referring now to the drawings in detail, where like numerals refer to like parts or elements, there is shown in FIG. 1 a typical land mobile vehicle electrical power distribution wiring diagram. The central controller of the present invention is the Fire Prevention and Detection Control Unit or FPD 10. The FPD 10 is a microcomputer-based controller that provides input monitoring interfaces with sensors mounted at appropriate locations on the vehicle, performs sensor monitoring functions, receives programmable parameters, communicates with other electronic devices on the vehicle via communications busses SAE J1939 and J1587, controls the flow of electrical power through battery and alternator circuits, provides alarm notification to the operator, and abnormal condition data to the vehicle data recorder, if existing. The FPD 10 is powered directly from the vehicle batteries 12 via power connection B+ and chassis ground 14.

The various inputs to the FPD 10 include current detector inputs Vehicle Current or IV that monitors the current through vehicle contactor (VC) 16 and Battery Current or IB that monitors the current through battery contactor (BC) 18. The battery contactor 18 can be a mechanical contactor or a solid-state device that is normally open blocking current flow through the device. Current flow through this device is bi-directional. The battery contactor 18 must be manually closed or reset, but it can either be manually disconnected or disconnected by control signal from the FPD 10 over the disconnect battery contactor DBC signal line. Similarly, the vehicle or electrical system contactor 16 is located in the vehicle electrical system between the alternator ALT and the starter node 20 and the electrical distribution panel. The electrical system contactor can be a mechanical contactor or a solid-state device with current flow always in the direction of the electrical distribution panel of the vehicle.

There are also a number of vehicle condition sensors that provide sensed inputs to the FPD 10. The IMPACT/CRASH detector is a solid-state accelerometer type device that is capable of distinguishing between an impact on the vehicle and mere vibration. The ROLLOVER sensor is a solid-state accelerometer type device that can be separate from, or combined with the Impact/Crash sensor in a similar fashion as some airbag deployment systems. There are two Temperature Sensors, TEMP 1 and TEMP 2, located in the engine compartment on opposite sides of the engine. These devices are Positive Coefficient Thermistors for measuring and relaying ambient temperatures at their respective locations. Additionally there is a single SMOKE detector located in the cab or sleeper area of the vehicle. The smoke detector can be either an optical (photoelectric) or ionization type detector.

The IMPACT/CRASH, ROLLOVER and SMOKE Detectors provide digital input signals to the FPD 10. The Temperature Sensors, TEMP 1, TEMP 2, provide analog signals to the FPD 10 that are converted to digital levels for processing. Voltages from both the Starter Node 20 (S) and the vehicle contactor 16 (VL) are measured as analog signals and converted digital levels.

There are several outgoing command or control signals emanating from the FPD 10. The FPD 10 controls the disconnecting of both the battery contactor 18 and the vehicle contactor 16 over respective signal lines DBC and DVC. The control signal lines are activated based upon detected sensor values and the parameters preset into the FPD 10.

There are also two serial communications ports J1587 and J1939 connecting the FPD 10 to other electronic and digital data storage devices on board the vehicle. The J1587 is the communications protocol standard developed by SAE International for data sharing and diagnostics on heavy-duty and most medium-duty vehicles. The FPD 10 monitors the J1587 Communication Port 22 in its entirety. The J1587 data establishes the basic operation modes of the vehicle: stationary [Y/N], Key On [Y/N], Engine Running [Y/N], etc. The parameters that are monitored include, but are not limited to, Vehicle Speed, Engine Speed, PTO Mode, Battery Voltage, Service Brake [On/Off], Parking Brake [On/Off], Ambient Temperature, Coolant Temperature, Oil Temperature, Inlet Air Temperature, Fuel Flow Rate, Cruise Control [Mode/Status], and Active Fault Codes.

The J1587 Communication Port 22 provides engine and vehicle sensor data retrieved from the vehicle such as ambient temperature, engine speed, vehicle speed, date and time. The J1587 Communication Port 22 is also used for customizing the programmable parameters stored in the FPD 10 and for communicating fault data, and also provides a warning notice of imminent shutdown for the operator. The fault messages and shutdown warning is read by the vehicle electronics. The actual messaging to the driver will vary with each OEM or aftermarket installation.

The J1939 is a high speed communication, control and diagnostic protocol standard also developed by SAE International for heavy-duty and most medium-duty vehicles. This is a wide band communication system that provides real time data and requests for all or specific electronic modules on the J1939 data bus. The J1939 Communication Port 24 provides real time data for starter engaged/disengaged, key on/off, engine run/not run, available fault codes and operating conditions. The entire J1939 data will be monitored by the FPD 10 with such data being stored on a first-in first-out memory storage device so that data prior to shutdown event can be saved for later reconstruction.

The electrical schematic of FIG. 1 shows the electrical connections among the FPD 10, batteries 12 alternator (ALT), STARTER and the VEHICLE ELECTRICAL LOADS 26. By definition, Vehicle Electrical Loads 26 includes all electrical devices, electronics and control systems on the vehicle except the FPD 10 that is powered directly from the batteries 12.

Both battery contactor (BC) 18 and vehicle contactor (VC) 16 are normally open switching devices. Battery contractor (BC) 18 must be manually set to provide electrical continuity across the contacts. No external control or signal voltage for setting is permitted. These two contactors are in series with existing electrical circuits, thus allowing for normal operation of the vehicle electrical system. The driver can start and stop the engine, and switch electrical loads on and off in the usual manner. Battery contactor (BC) 18 remains closed during normal operation. An anomaly or abnormal condition detected by FPD 10 will trigger a signal DBC to disconnect the BC 18 opening the electrical circuit and isolating the batteries 12. Similarly, an anomaly or abnormal condition detected by the FPD 10 will trigger a signal DVC to disconnect the VC 16 opening the electrical circuit to the Vehicle Electrical Loads 26 isolating the alternator ALT from the system electrical circuits. Once electrically disconnected, the contactors BC 18 and VC 16 will remain in an open circuit status until contactor BC 18 is manually reset. VC 16 is reset electronically by FPD (10) in order to restore electrical power to the vehicle.

Input IB from the battery shunt [IBAT] 28 reflects the battery current at any given instant in time. The current may be positive or negative depending on whether the battery is being charged or discharged. Input IV from the vehicle shunt [IVL] 30 reflects the vehicle current being used at any given instant in time. This represents the total electrical load on the vehicle with the only exception being the FPD 10 current that comes directly from the vehicle batteries 12. An alternative to using the battery and vehicle shunts 28, 30, which will reduce the cost and complexity of using the shunts, can be accomplished by deriving the respective currents from known circuit points, e.g. Starter Node 20, that provide the same information and physical properties of the system.

The battery current is calculated using Ohm's law where current is voltage divided by resistance. The voltage is the difference between the vehicle battery voltage B+ and the voltage S at the starter node 20. The resistance of the circuit is a stored programmable parameter for the specific vehicle. A correction value is then applied for ambient temperature that is read from the J1587 communications port 22. The vehicle current is also calculated using Ohm's law where current is voltage divided by resistance. The voltage is the difference between the voltage S at the starter node 20 and the voltage VL measured at the source side of VC 16. The resistance of the cable is a stored programmable parameter for the specific vehicle. A correction value is then applied for ambient temperature that is also read from the J1587 communications port 22.

The FPD 10 will function in accordance with the following. The basic function will be executed routinely and repetitively. Sampling of the various sensor inputs are repeated at designated intervals and computations made to be compared against the predetermined current and temperature limits. Upon the occurrence of either the current or temperature predetermined limits being exceeded, the FPD 10 will issue a shutdown warning [FPD_SW] signal which activates both a visible and audible alert for the operator. If the FPD_SW signal continues for a contiguous 30 seconds, then an irreversible electrical shutdown will commence. Once an FPD_S is triggered by the FPD 10, all electrical power is disconnected by initiating the DBC and DVC signals interrupting power flow to the vehicle and all electrical loads, including power to the FPD 10.

The engine compartment temperature is monitored by two Engine Compartment Temperature Sensors, TEMP 1, TEMP 2, which are located on each side of the engine. Each Sensor, TEMP 1, TEMP 2, are assigned a high temperature warning [HT_TW] and high temperature shutdown [HT_S]. The occurrence of a HT_W enables a FPD_SW and, if the vehicle is stationary, the horn is sounded. The FPD_S will be triggered if the condition persists for longer than 30 seconds. Following the 30 second warning, a HT_S signal is initiated which triggers a FPD_S shutdown command that will interrupt the circuit to both the BC18 and the VC 16 disconnecting all electrical power. In the event that the smoke detector in the driver's compartment detects smoke in that compartment, both the visible and audible alarms are triggered giving the operator notice of the detected smoke. If the vehicle is stationary at the time of detection, the horn will be sounded as well. The horn sounding automatically resets within the 30 second window and is restarted. After the 30 second period has lapsed, the FPD_S signal is triggered and the engine is shutdown by interrupting power to the electrical load, and isolating the battery and the alternator. When a rollover is detected, or when a frontal impact is detected, the FPD_S signal is triggered immediately.

The battery current is continually monitored under all vehicle conditions, even if the vehicle is parked with the key in the off position. Upon vehicle starting, in the Vehicle Start Mode with the key on and the starter engaged, the battery current can exceed the STARTER HIGH CURRENT [SHC] threshold for no more than 3 seconds. If the SHC remains above the threshold for more than 3 seconds, the FPD_S is triggered and the engine will not start, or remain on if starting was accomplished. In the Key On Mode, whenever the current going into the battery 12 exceeds the battery current out [BC_OUT], the alarms are triggered for the operator in the vehicle cab and, if the vehicle is stationary, the horn is also sounded for 30 seconds. After the 30 second period the FPD_S signal is triggered and the vehicle engine and all electrical power is shutdown. In the Key Off Mode, whenever the battery current exceeds BC_KEYOFF the alarms are triggered for the operator in the vehicle cab and, if the vehicle is stationary, the horn is also sounded for 30 seconds. After the 30 second period the FPD_S signal is triggered and the vehicle engine, and all electrical power is shutdown. Whenever the sensed current to the VEHICLE ELECTRICAL LOAD 26 is above the pre-defined threshold (TPF-LMT) the shutdown warning (FPD-SW) is triggered. If the vehicle is stationary, the horn is also sounded for 30 seconds. This function will automatically reset within the 30 second period if the threshold does not remain above the preset limit. After the 30 second period the FPD_S signal is triggered and the vehicle engine and all electrical power is shutdown.

Predetermined parameters are uploaded to the FPD 10 before installation in the vehicle or by means of the data bus interfaces through the J1587 or J1939 Communications Ports 22, 24. The preset parameters are retained in memory onboard the FPD 10 until changed at a later time. The preset parameters are utilized to compute threshold values and limit values to provide the control in warning the operator and shutting down the electrical system and engine of the vehicle.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. An engine-powered land vehicle comprising:
   an engine:
   a first power source for providing power to the engine and power to selected vehicle electrical loads;
   a starter motor for starting the engine by drawing current from the first power source;
   a first contactor coupled between the first power source and the starter motor, and between the first power source and the selected vehicle electrical loads;
   a second power source, different from the first power source, for providing power to the selected vehicle electrical loads when the engine is operational;

a second contactor coupled between the second power source and the selected vehicle electrical loads; and
a fire prevention and detection control unit electrically coupled to the first power source, the first contactor, the starter motor, the second power source, the second contactor, and the selected electrical loads, and configured to:
  determine an automatic disconnection condition for the land vehicle; and
  control both the first contactor and the second contactor to disconnect the starter motor and the selected vehicle electrical loads from the first power source, and to disconnect the selected vehicle electrical loads from the second power source.

2. The land vehicle according to claim 1, wherein:
the first power source is a battery bank; and
the second power source is an alternator.

3. The land vehicle according to claim 1, wherein:
the first contactor is configured to be reset only manually after being disconnected by the fire prevention and detection control unit; and
the second contactor is configured to be reset electrically by the fire prevention and detection control unit after being disconnected by the fire prevention and detection control unit.

4. The land vehicle according to claim 1, further including:
a plurality of data links coupled to the fire prevention and detection control unit to provide data from other onboard vehicle data devices.

5. The land vehicle according to claim 1, further including:
a plurality of sensors coupled to the fire prevention and detection control unit to provide operating parameters of the land vehicle, wherein the plurality of sensors includes at least a first current sensor to measure a first current related to the first power source and a second current sensor to measure a second current related to the selected vehicle electrical loads.

6. The land vehicle according to claim 5, wherein:
the plurality of sensors further includes a first temperature sensor to measure a first temperature related to an engine compartment and a second temperature sensor to measure a second temperature related to the engine compartment.

7. The land vehicle according to claim 6, wherein:
the plurality of sensors further includes a vehicle rollover sensor, a vehicle impact sensor, and a smoke sensor for detecting a smoke condition in a cab of the land vehicle.

8. The land vehicle according to claim 6, wherein:
the fire prevention and detection control unit determines the automatic disconnection condition after at least one of the first current, the second current, the first temperature, and the second temperature exceeds a corresponding predetermined limit.

9. The land vehicle according to claim 8, wherein:
the fire prevention and detection control unit first determines a warning condition when the at least one of the first current, the second current, the first temperature, and the second temperature exceeds the corresponding predetermined limit; and
the fire prevention and detection control unit determines the automatic disconnection condition after the warning condition lasts a predetermined period of time.

10. The land vehicle according to claim 9, wherein:
the fire prevention and detection control unit activates both a visible alert and an audible alert for an operator of the land vehicle after determining the warning condition.

* * * * *